US011373508B2

(12) United States Patent
Glatfelter et al.

(10) Patent No.: US 11,373,508 B2
(45) Date of Patent: Jun. 28, 2022

(54) COMPUTER-IMPLEMENTED METHODS AND SYSTEM FOR MONITORING PERSONNEL ACTIVITY USING NON-MOTION SENSORS

(71) Applicant: The Boeing Company, Chicago, IL (US)

(72) Inventors: John William Glatfelter, Kennett Square, PA (US); Jeff Alan Heisserman, Clinton, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 16/777,299

(22) Filed: Jan. 30, 2020

(65) Prior Publication Data
US 2021/0241599 A1    Aug. 5, 2021

(51) Int. Cl.
| G08B 21/22 | (2006.01) |
| G08B 21/18 | (2006.01) |
| H04W 4/021 | (2018.01) |
| H04W 4/90 | (2018.01) |
| G08B 21/02 | (2006.01) |
| H04W 4/029 | (2018.01) |
| G08B 25/01 | (2006.01) |

(52) U.S. Cl.
CPC .......... *G08B 21/22* (2013.01); *G08B 21/02* (2013.01); *G08B 21/182* (2013.01); *G08B 25/016* (2013.01); *H04W 4/021* (2013.01); *H04W 4/029* (2018.02); *H04W 4/90* (2018.02)

(58) Field of Classification Search
None
See application file for complete search history.

(56) References Cited

U.S. PATENT DOCUMENTS

| 6,990,047 | B1 * | 1/2006 | Barbagiovanni | .... A44C 5/0015 222/175 |
| 10,885,758 | B2 * | 1/2021 | Johnson | .................. G01S 17/93 |
| 2004/0174258 | A1 * | 9/2004 | Edelstein | ............. G08B 21/028 340/539.13 |
| 2007/0232275 | A1 * | 10/2007 | Collins | .................. H04W 4/029 455/413 |
| 2009/0160643 | A1 * | 6/2009 | Lizza | ................. G08B 21/0415 340/540 |
| 2010/0267361 | A1 * | 10/2010 | Sullivan | .................. H04W 4/02 455/404.2 |
| 2010/0321184 | A1 * | 12/2010 | Dreuillet | ................. G01S 13/56 340/540 |
| 2014/0266791 | A1 * | 9/2014 | Lloyd | ................ G08B 21/0423 340/870.09 |
| 2015/0248824 | A1 * | 9/2015 | Kamalakannan | .... G06Q 90/205 340/539.13 |

(Continued)

*Primary Examiner* — Curtis J King
(74) *Attorney, Agent, or Firm* — Sage Patent Group (57) ABSTRACT

A computer implemented method for monitoring personnel activity in a work environment includes receiving motion sensor data generated by a motion sensing device that is carried on or by a worker, determining a location of the motion sensing device, detecting a lack of expected movement of the motion sensing device, and generating an alert based on the location of the motion sensing device and the detected lack of expected movement of the motion sensing device. Related systems and computer program products are disclosed.

19 Claims, 7 Drawing Sheets

(56) References Cited

U.S. PATENT DOCUMENTS

| | | | | |
|---|---|---|---|---|
| 2015/0269835 | A1* | 9/2015 | Benoit | H04M 19/04 |
| | | | | 340/539.13 |
| 2016/0139240 | A1* | 5/2016 | Sutter | G01S 5/0221 |
| | | | | 342/465 |
| 2016/0232771 | A1* | 8/2016 | Mendiola | F16P 3/14 |
| 2017/0358194 | A1* | 12/2017 | Glatfelter | G01T 1/178 |
| 2018/0151037 | A1* | 5/2018 | Morgenthau | G08B 7/06 |
| 2018/0210437 | A1* | 7/2018 | Ashar | G08B 21/0415 |
| 2018/0279911 | A1* | 10/2018 | Lucisano | A61B 5/076 |
| 2018/0312181 | A1* | 11/2018 | Cross | B61L 25/021 |
| 2019/0037934 | A1* | 2/2019 | Swank | G08B 21/02 |
| 2019/0093318 | A1* | 3/2019 | Izumikawa | E02F 9/24 |
| 2019/0241124 | A1* | 8/2019 | Izumikawa | G08B 21/22 |
| 2019/0320945 | A1* | 10/2019 | Johnson | G08B 21/0446 |
| 2019/0340560 | A1* | 11/2019 | Sundia | G06Q 10/063114 |
| 2020/0064433 | A1* | 2/2020 | Finlay | G01S 5/0257 |
| 2020/0217049 | A1* | 7/2020 | Mizuochi | G01S 19/42 |

\* cited by examiner

COMPUTER-IMPLEMENTED METHODS AND SYSTEM FOR MONITORING PERSONNEL ACTIVITY USING NON-MOTION SENSORS

FIELD

The present disclosure is related to manufacturing. In particular, the present disclosure relates to systems and methods for monitoring personnel activity in manufacturing environments.

BACKGROUND

Worker safety is an important concern in modern manufacturing environments. Worker safety can be compromised or endangered whenever workers are using or working around heavy equipment, working within confined spaces, and/or working with hazardous chemicals or other materials. To help ensure worker safety in those situations, it is desirable to monitor the movements and activities of workers in the manufacturing facility. However, that may be a difficult task in manufacturing environments where large equipment or machinery is being built, since workers may be required to go into confined spaces during the manufacturing process where they are hidden from view.

An example of such a working environment is a manufacturing plant that manufactures airplanes, boats or other large transportation vehicles. It is often required for workers in such environments to enter into confined spaces, such as an airplane wingbox, fuselage/empennage, hull, engine bay, etc. Moreover, such work often involves the use of heavy equipment and/or dangerous chemicals, such as sealants, solvents, etc. If a worker were to suffer an injury or become incapacitated while in such a location, it may go unnoticed for some period of time, which may undesirably delay an emergency response.

SUMMARY

A computer implemented method for monitoring personnel activity in a work environment includes receiving motion sensor data generated by a motion sensing device that is carried on or by a worker, determining a location of the motion sensing device, detecting a lack of expected movement of the motion sensing device, and generating an alert based on the location of the motion sensing device and the detected lack of expected movement of the motion sensing device.

Detecting the lack of expected movement of the motion sensing device includes determining, from the motion sensor data, that movement of the motion sensing device has dropped below a threshold level for a predetermined period of time.

In an embodiment, a level of the alert is be based on the location of the motion sensing device.

In an embodiment, the method includes determining a geographic zone in which the motion sensing device is located, and obtaining a risk level associated with the geographic zone in which the motion sensing device is located. In an embodiment, the level of the alert is based on the risk level associated with the geographic zone in which the motion sensing device is located.

In an embodiment, obtaining the risk level associated with the geographic zone includes obtaining the risk level from a library of geographic zones that contains expected motion profiles associated with the geographic zones, and the method further includes comparing movement of the motion sensing device with an expected motion profile associated with the geographic zone to determine lack of expected movement of the motion sensing device.

In an embodiment, the motion sensor data includes first motion sensor data, and the method further includes receiving second motion sensor data generated by a second motion sensing device that is carried on or by the worker, and comparing the second motion sensor data with the first motion sensor data. The alert may be generated based on the first motion sensor data and the second motion sensor data.

In an embodiment, receiving the motion sensing data includes receiving the motion sensing data from an accelerometer and/or a satellite positioning device.

In an embodiment, receiving the motion sensing data includes receiving an indication of lack of expected movement of the motion sensing device.

In an embodiment, the method further includes receiving non-motion sensor data generated by a non-motion sensing device that is carried on or by the worker. The alert is generated in response to the non-motion sensor data in combination with the motion sensor data and the location of the motion sensing device.

In an embodiment, receiving the non-motion sensor data includes receiving at least one of chemical sensor data, vibration sensor data, temperature sensor data, barometric pressure sensor data, audio sensor data, and toxin sensor data.

In an embodiment, the method further includes obtaining position history information of the motion sensing device, and the alert may be generated in response to the position history information in combination with the motion sensor data and the location of the motion sensing device.

In an embodiment, the method further includes transmitting an alarm to an electronic device carried on or by the worker in response to the location of the motion sensing device and the detected lack of movement of the motion sensing device.

In an embodiment, the method further includes validating the alert based on aggregating sensor data from a plurality of sensors including the motion sensing device, and initiating a responsive action based on validating the alert.

In an embodiment, the method further includes applying a set of non-motion rules to the detected lack of motion, wherein the alert is generated based on the set of non-motion rules.

In an embodiment, the method further includes generating the alert based on application of a neural network having as inputs the detected lack of motion of the motion sensing device and the location of the motion sensing device.

In an embodiment, the method further includes generating a first alert, and if no response is received to the first alert, generating a second alert after a first period of time, wherein the second alert has a higher priority level than the second alert.

A system for monitoring personnel activity in a work environment includes a processing circuit, and a memory circuit coupled to the processing circuit, wherein the memory circuit includes computer-readable program instructions that, when executed by the processing circuit, cause the system to perform operations of receiving motion sensor data generated by a motion sensing device that is carried on or by a worker, detecting a lack of expected movement of the motion sensing device, determining a location of the motion sensing device, and generating an alert based on the location of the motion sensing device and the detected lack of expected movement of the motion sensing device.

A computer program product for monitoring personnel activity in a work environment includes a non-transitory computer readable storage medium having computer readable program code embodied in the medium. The computer readable program code includes computer readable program code configured to receive motion sensor data generated by a motion sensing device that is carried on or by a worker, computer readable program code configured to detect a lack of expected movement of the motion sensing device, computer readable program code configured to determine a location of the motion sensing device, and computer readable program code configured to generate an alert based on the location of the motion sensing device and the detected lack of expected movement of the motion sensing device.

The features and functions can be achieved independently in various embodiments of the present disclosure or may be combined in yet other embodiments in which further details can be seen with reference to the following description and drawings.

BRIEF DESCRIPTION OF THE DRAWINGS

A series of drawings which aid in better understanding the disclosure and which are presented as non-limiting examples and are very briefly described below.

DETAILED DESCRIPTION

Embodiments will now be described more fully hereinafter with reference to the accompanying drawings. The disclosed embodiments may, however, be embodied in many different forms and should not be construed as limited to the specific embodiments set forth herein. Rather, these embodiments are provided so that this disclosure will be thorough and complete, and will fully convey the scope of the disclosed subject matter to those skilled in the art. Like numbers refer to like elements throughout.

As noted above, it is often required for workers in manufacturing environments to enter into confined spaces where they cannot easily be observed and where they may be exposed to potentially hazardous conditions. Some embodiments provide systems/methods for monitoring personnel activity in a work environment so that if a worker becomes incapacitated, such event can be detected and addressed. Some embodiments described herein provide systems/methods that receive motion sensor data generated by a motion sensing device that is carried on or by a worker in a manufacturing environment. The systems/methods monitor the movement of the motion sensing device to detect a lack of expected movement of the motion sensing device. A lack of movement of the motion sensing device may indicate that the worker has stopped moving, which may indicate that the worker has become incapacitated.

In response to detecting a lack of expected motion of the motion sensing device, the systems/methods determine a location of the motion sensing device and generate an alert based on the location of the motion sensing device and the detected lack of expected movement of the motion sensing device. The level of expected motion and the type of hazard that may be faced by the worker may depend on the location the worker is working in. For example, a worker in a confined space may be expected to move with a certain average velocity that is lower than an expected average velocity of movement when the worker is in an open area. Moreover, a worker may be more likely to be exposed to hazardous chemicals in some locations than others. Thus, in an example embodiment, the systems/methods define one or more geographical areas of a manufacturing floor. Each defined location is associated with an expected motion profiles and/or a hazard level. The systems/methods compare the detected motion of the motion sensing device to an expected motion profile associated with a geofenced area in which the motion sensing device is located to determine whether an alert should be generated. The type of alert generated depends on the hazard level associated with the area.

Figure 1A:
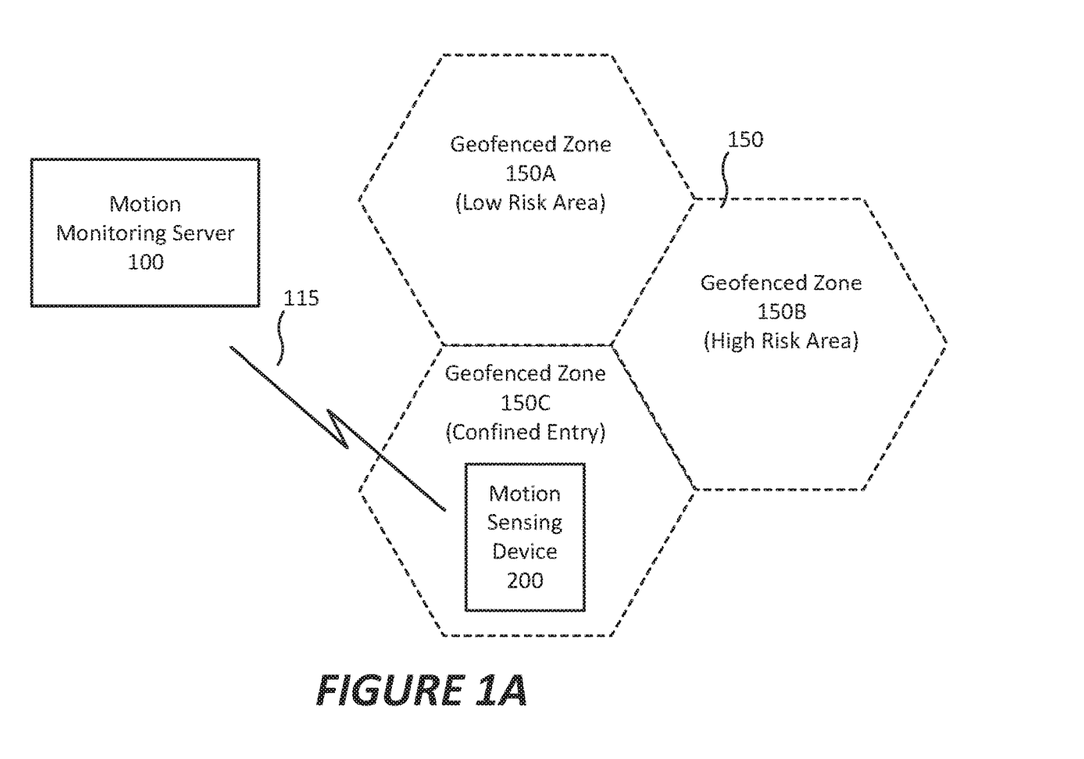
FIG. 1A is a schematic illustration of a work environment in which embodiments of the present disclosure may be employed.

FIG. 1A is a schematic illustration of a work environment 160 that has been divided into a plurality of geofenced zones 150A to 150C. The work environment 160 may, for example, be a manufacturing floor of a manufacturing facility. However, embodiments of the inventive concepts are not limited to manufacturing environments, and the work environment could include other environments, such as a storage facility, a mining facility, an office building or other work environment.

Referring to FIG. 1A, a work environment 160 may be logically divided into a plurality of geofenced zones 150A to 150C, each of which may have an assigned risk or hazard level. A worker may carry a motion sensing device 200 when working within the environment 160. The motion sensing device 200 detects motion and reports detected motion to a motion monitoring server 100 via a wireless communication link 115, which may use a wireless communication protocol such as Wifi, Bluetooth, 5G, etc. Motion sensing devices 200 and motion monitoring servers 100 are discussed in more detail below. The motion monitoring server 100 compares the detected motion of the motion sensing device 200 to an expected motion profile or threshold that depends on the current location of the motion sensing device 200. The location of the motion sensing device 200 may be reported to the motion monitoring server 100 via the wireless communication link 115, or may be determined or estimated by the motion monitoring server 100 by other means, such as triangulation.

For example the motion monitoring server 100 detects when the motion sensing device enters a geofenced zone 150A-150C. The motion monitoring server 100 receives motion data from the motion sensing device 200 while the motion sensing device 200 is located within the geofenced zone 150A-150C and compares the motion data to an expected motion profile associated with the geofenced zone 150A-150C in which the motion sensing device is located. If the level of motion of the motion sensing device 200 falls below a predetermined threshold based on the geofenced zone in which the motion sensing device 200 is located, the motion monitoring server 100 generates an alert based on a level of risk or hazard associated with the geofenced zone 150A-150C in which the motion sensing device is located. Potential hazards that may be encountered in high risk areas include chemical exposure, moving parts or equipment, electrical shock, and flammable materials, etc. For example, in FIG. 1A, geofenced zone 150A is classified as a low risk area, zone 150B is classified as a high risk area, and zone 150C is classified as a confined entry area. When a lack of motion is detected while the motion sensing device 200 is in a low risk area, the systems/methods send a notification to the motion sensing device 200 and/or to the worker. In contrast, a lack of motion is detected while the motion sensing device 200 is in a high risk area, the systems/methods send an alert message to a response team requesting a status check on the worker. Many other types of alerts are possible as described below. Moreover, systems/methods according to some embodiments generate a series of alerts with increasing severity if no response is received, as described in more detail below.

Figure 1B:
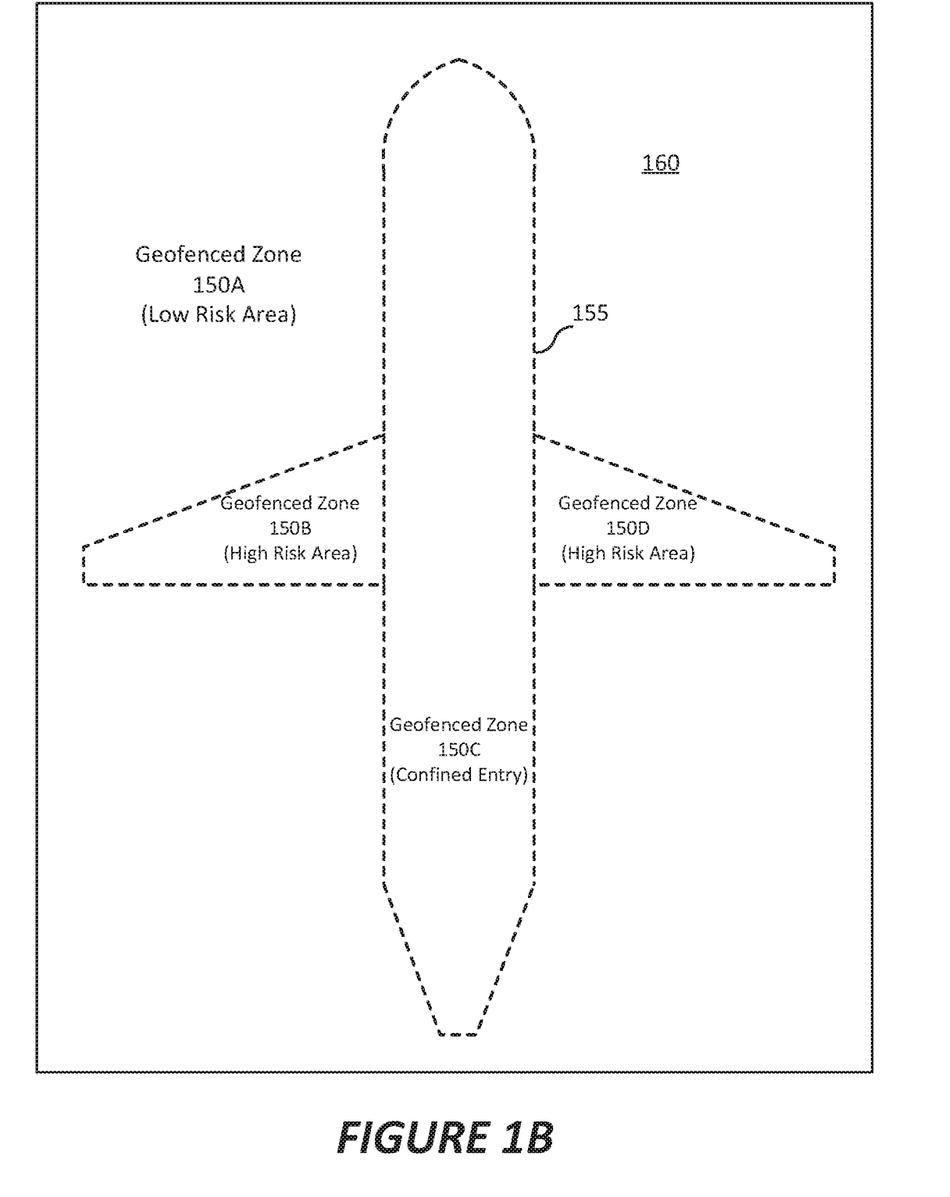
FIG. 1B illustrates an example in which the work environment is an airplane manufacturing facility.

Although illustrated as geometric shapes in FIG. 1A, it will be appreciated that the geofenced areas may have arbitrary shapes depending on the configuration of the work environment 160. FIG. 1B illustrates an example in which the work environment is an airplane manufacturing facility. During the airplane manufacturing process, personnel may be working anywhere on or around an airframe 155 within the work environment 160. In this example, the area outside the airframe 155 may be designated as geofenced zone 150A and may be classified as a low risk area. The main fuselage of the airframe 155 may be designated as geofenced zone 150C and may be classified as a confined entry area having a medium risk because entry to the area is restricted, the space is confined and workers may not be visible while inside the fuselage. The wingboxes of the airframe may be designated as geofenced zones 150B and 150D and may be classified as a high risk areas because entry to the area is highly restricted, the space is highly confined and workers may not be visible while inside. A geofenced zone may also be classified as a medium- or high-risk area if workers are expected to be working near potentially hazardous materials while in the zone, such as solvents, adhesives, fuels, etc.

Other geofenced zones 150 that may be defined in the aircraft manufacturing context may include the wheel wells, avionics bay, fuel tanks, etc.

In some cases, the level of risk associated with a geofenced zone may be changed based on timing and/or other events occurring in or near the work environment. For example, still referring to FIG. 1B, the area around the airframe in geofenced zone 150A may normally be considered a low risk area. However, the status of the geofenced zone 150A may be changed to a medium- or high-risk area during power-up of a powered system of the aircraft and/or any time a large component of the aircraft, such as an engine, is being moved in or near the geofenced zone 150A.

Figure 2A:
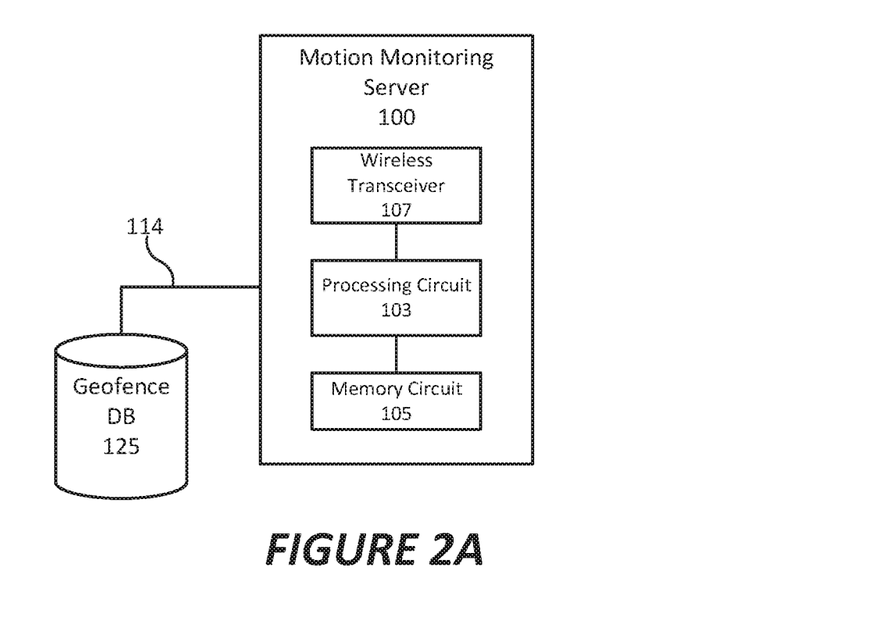
FIG. 2A illustrates elements of a motion monitoring server according to some embodiments.
Figure 2B:
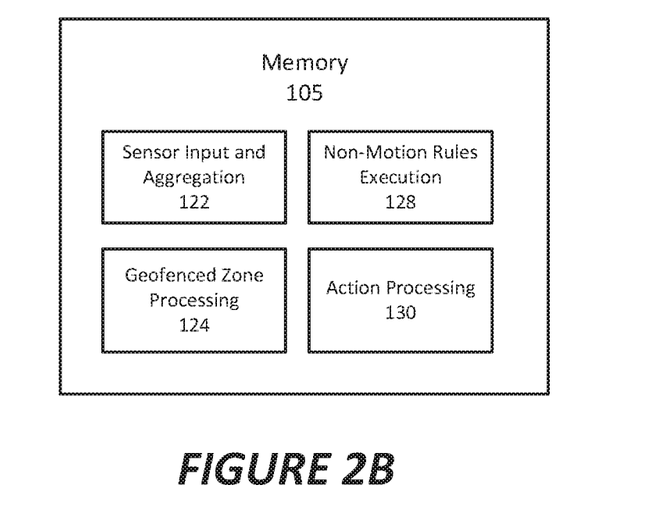
FIG. 2B illustrates functional modules of a motion monitoring server according to some embodiments.

FIGS. 2A and 2B illustrate elements of a motion monitoring server 100 according to some embodiments. Referring to FIG. 2A, a motion monitoring server 100 includes a processing circuit 103 and a memory circuit 105 that stores computer readable program instructions that, when executed by the processing circuit 103 cause the processing circuit 103 to perform operations described herein. A geofence database 125 that contains information describing the boundaries of geofenced zones 150A-150C as shown in FIG. 1A is communicatively coupled to the motion monitoring server 100 via a wired or wireless communication link 114. The motion monitoring server 100 further includes a wireless transceiver 107 for communicating with one or more motion sensing devices 200 via wireless communication link 115 (FIG. 1A).

FIG. 2B illustrates various functional modules that are stored in the memory circuit 105 and executed by the processing circuit 103. As shown therein, the functional modules include a sensor input and aggregation module 122 for receiving and processing location and motion sensing data from the motion sensing device 200, a geofenced zone processing module 124 for determining what geofenced zone a motion sensing device is in, a non-motion rules execution module 128 for determining what action to take when a lack of motion of a motion sensing device 200 is detected, and an action processing module 130 for executing the determined action when a lack of motion of a motion sensing device 200 is detected.

Figure 3:
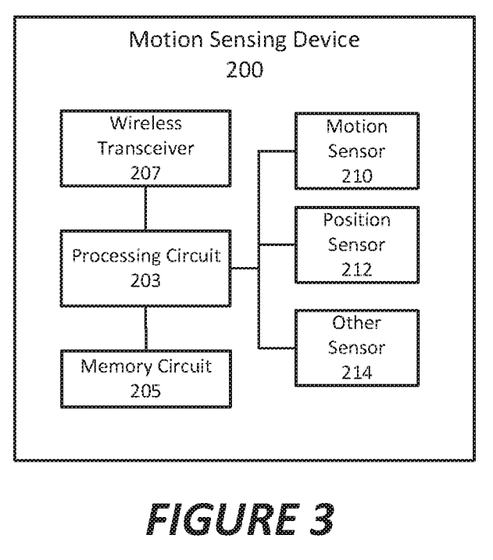
FIG. 3 illustrates elements of a motion sensing device according to some embodiments.

FIG. 3 illustrates elements of a motion sensing device 200 according to some embodiments. Referring to FIG. 3, a motion sensing device 200 includes a processing circuit 203 and a memory circuit 205 that stores computer readable program instructions that, when executed by the processing circuit 203 cause the processing circuit 203 to perform operations described herein. The motion sensing device 200 further includes a wireless transceiver 207 for communicating with a motion monitoring server 100 via wireless communication link 115 (FIG. 1A).

The motion sensing device 200 further includes one or more sensors including, for example, a motion sensor 210 that detects motion of the motion sensing device and a position sensor 212 that detects a position of the motion sensing device. The position sensor 212 may include, for example, a global positioning sensor (GPS) and/or an augmented position sensor, such as a Wide Area Augmentation System (WAAS) sensor. The motion sensor 210 may include, for example, a six-axis accelerometer that measures rotational and translational acceleration of the motion sensing device 200 along three axes. Motion data sensed by the motion sensing device 210 may be transmitted to the motion monitoring server 100 as raw sensor data, such as accelerometer measurements, and/or as statistical or processed sensor data, such as average acceleration, variance of acceleration, etc.

The motion sensing device 200 may include other sensors 214, such as one or more chemical sensors, toxin sensors, vibration sensors, temperature sensors, barometric sensors, audio sensors, etc. Sensor data from such other sensors may be transmitted to the motion monitoring server 100 via wireless communication link 115 and used by the motion monitoring server 100 to determine if an alert should be generated.

In some embodiments, a motion sensing device 200 may be incorporated into a personal communication device, such as a mobile telephone, that may be carried by or on the person of a worker. A mobile telephone may be an ideal motion sensing device, because mobile telephones often have built in hardware, such as accelerometers GPS receivers, and wireless transceivers, that can be used to implement functions of a motion sensing device 200 described herein. In other embodiments, the motion sensing device 200 may be a separate device that is carried by or on a worker.

Figure 4:
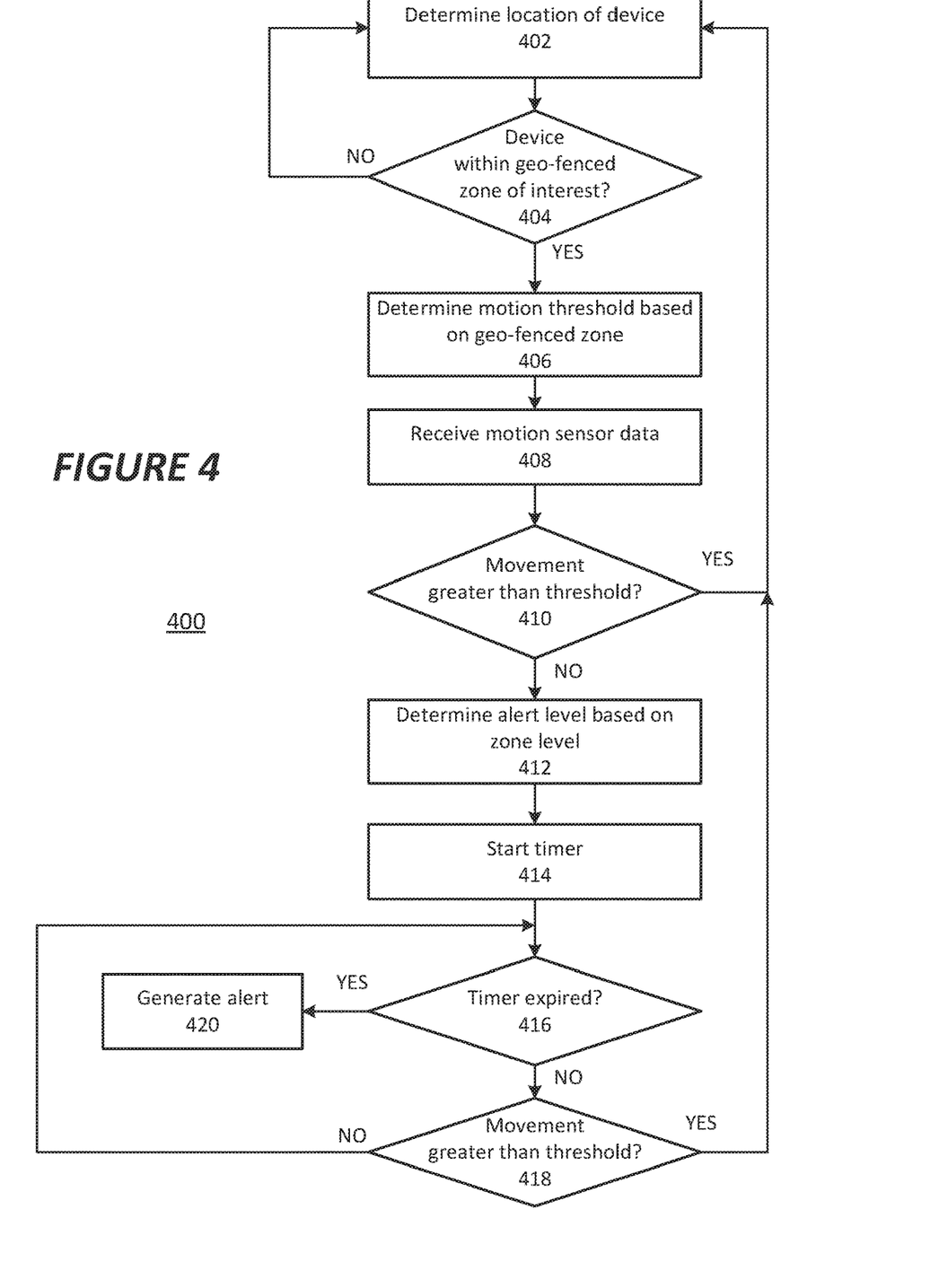
FIG. 4 is a flow chart illustrating operations for monitoring personnel activity according to some embodiments.

FIG. 4 is a flow chart of operations 400 for monitoring personnel activity according to some embodiments. The method may be implemented as a computer-implemented method using the motion monitoring server 100 as described in reference to FIGS. 2A and 2B.

Referring to FIG. 4, a computer-implemented systems/methods 400 according to some embodiments include determining a position of a motion sensing device 200 that is carried on or by a worker (block 402). The position may be determined, for example, based on GPS position data provided by the motion sensing device 200. At block 404, the systems/methods determine whether the motion sensing device 200 is located within a defined geo-fenced zone 150 by comparing the position of the motion sensing device 200 with geofence location information stored in the geofence information database 125 (FIG. 2A). The determination of whether the motion sensing device 200 is within a geofenced zone may be performed by geofenced zone processing module 124 (FIG. 2B). If the motion sensing device 200 is not within a goefenced zone of interest, operations return to block 402.

If the motion sensing device is determined to be located within a geofenced zone of interest, the systems/methods determine a motion threshold for the motion sensing device associated with the geofenced zone in which the motion sensing device is located (block 406).

The systems/methods then receive motion sensor data generated by the motion sensing device 200 (block 408), and determine, based on the motion sensor data, whether the motion of the device is greater than the threshold associated with the geofenced zone in which the motion sensing device 200 is located (block 410). If the detected movement of the motion sensing device 200 is greater than the predetermined threshold, operations return to block 402 where the systems/methods continue to monitor the location of the motion sensing device 200.

If the movement of the motion sensing device 200 is determined at block 410 to be less than the threshold, the systems/methods detect a lack of expected movement of the motion sensing device. The systems/methods then determine an alert based on a risk level associated with the geofenced zone in which the motion sensing device is located (block 412).

In some embodiments, a time delay may be provided such that the systems/methods will not generate an alert until the detected movement level of the motion sensing device falls below the threshold for a predetermined period of time. For example, the system may not generate an alert unless the detected movement level of the motion sensing device falls below the threshold for a period of one minute. The time delay may be based on the risk level associated with the geofenced zone and/or may be selected or adjusted based on other sensor readings. For example, if a chemical sensor associated with the geofenced zone generates an elevated reading, the time delay may be reduced so that an alert is triggered sooner.

Accordingly, once a lack of motion is detected and an alert level is determined, systems/methods according to some embodiments start a timer at block 414. The systems/methods check to see if the timer has expired, and if so generates an alert (block 420). If the timer has not expired, the systems/methods check to see if movement greater than the threshold level has been detected (block 418), and if so, resets the timer and returns operations to block 402. Otherwise, operations return to block 416, and the systems/methods continue to check for movement until the timer expires.

The decision to generate an alert may be based on sensor data in addition to motion sensor data. For example, the decision to generate an alert may be based on sensor data generated by one or more other sensors in the motion sensing device 200, such as chemical sensors, toxin sensors, vibration sensors, temperature sensors, audio sensors and/or other sensors. Sensor data from other sensors may be analyzed, and the risk level associated with a geofenced area and/or the movement threshold for generating an alert may be adjusted based on the sensor data. For example, if a chemical sensor or temperature sensor generates an elevated reading, the threshold level of motion needed to trigger an alert may be increased so that a smaller decrease in movement level may trigger an alert. The collection and aggregation of sensor data may be managed by a sensor input and aggregation module 122 (FIG. 2B).

In some embodiments, the determination of whether or not to generate an alert may be performed by non-motion rules execution module 128 (FIG. 2B). The non-motion rules execution module 128 may combine sensor information to determine whether or not an alert should be generated. In some embodiments, the non-motion rules execution module 128 may implement a machine learning/artificial intelligence algorithm that utilizes an artificial neural network to assist in the decision of whether or not to generate an alert.

Figure 5:
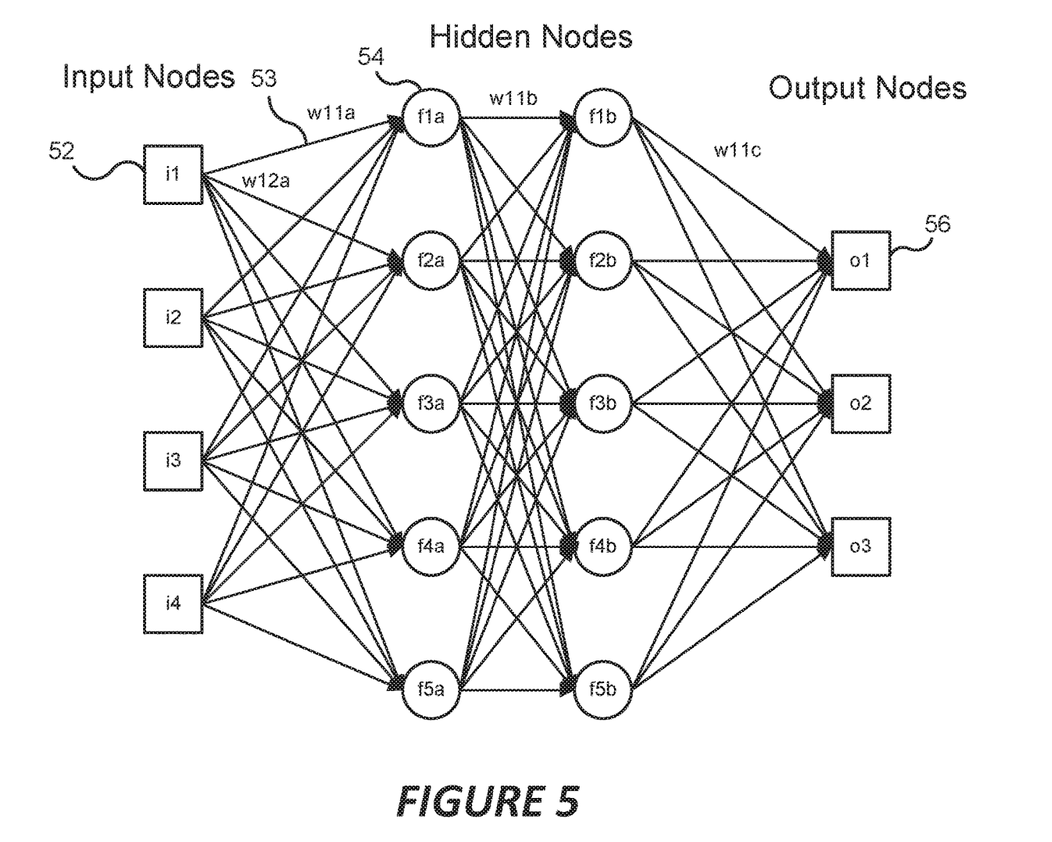
FIG. 5 illustrates simplified example of an artificial neural network that may be used by a motion monitoring server according to some embodiments.

A simplified example of an artificial neural network is shown in FIG. 5. Referring to FIG. 5, an artificial neural network includes a plurality of input nodes 52 corresponding to a plurality of input parameters, a plurality of hidden nodes 54 coupled to the plurality of input nodes 52 by means of a plurality of connectors 53, and a plurality of output nodes 56 coupled to the plurality of hidden nodes 54, each of the plurality of hidden nodes having an associated combinational function and each of the connectors having an associated weight. Although two levels of hidden nodes are shown in FIG. 5, more levels of hidden nodes may be provided. Moreover, more or fewer input nodes and/or output nodes may be provided than are shown in FIG. 5. At least one of the plurality of output nodes is associated with a decision of whether or not to trigger an alert. One or more output nodes may indicate a timer value to be associated with the alert.

At least one of the inputs corresponds to a measured level of movement of the motion sensing device 200. Others of the inputs may correspond to one or more sensor inputs from other sensors, such as chemical sensors, temperature sensors, etc. Each of the inputs is assigned a numerical value at the corresponding input node. A weight is applied to each input parameter when it is propagated to a node at the next level of the model. For example, a weight w11$a$ is applied to the parameter at input node i1 before it is applied to the node f1$a$. Likewise, a weight w12$a$ is applied to the parameter at input node i1 before it is applied to the node f2$a$. At each node, the weighted inputs received at that node are processed by a combinational function, such as f1$a$, f2$a$, etc., and the output of the node is subsequently weighted applied to nodes in the next level. At the output node, the outputs of the hidden nodes are optionally weighted again and combined to provide outputs.

A neural network may be particularly useful for validating alerts, i.e., for distinguishing between actual alert conditions in which an alert is needed and false positive conditions for which no alert is needed, because neural networks can process multiple different inputs simultaneously.

In some embodiments, systems/methods may generate additional sequential alarms with increasing severity/urgency if no response is received to the initial alarm. The systems/methods may generate a first alert, and if no response is received to the first alert, generate a second alert after a first period of time, wherein the second alert has a higher priority level than the second alert.

For example, an initial alert may include sending a text message to the motion sensing device 200 or other device associated with the user of the motion sensing device 200. If no response is received to the text message and no movement is detected, the systems/methods may send an audible alert to the motion sensing device 200 or other device after a first time interval. If no response is received to the audible alert, a phone call may be placed to the motion sensing device 200 or other device after a second time period following the first time interval. The second time interval may be less than the first time interval. If no response is received to the phone call and no movement is detected within a third time interval, emergency personnel may be dispatched after a third time interval. The third time interval may be less than the second time interval.

Accordingly, as the lack of motion continues, the severity and/or urgency of the alarm may be increased until resolution of the condition.

Figure 6:
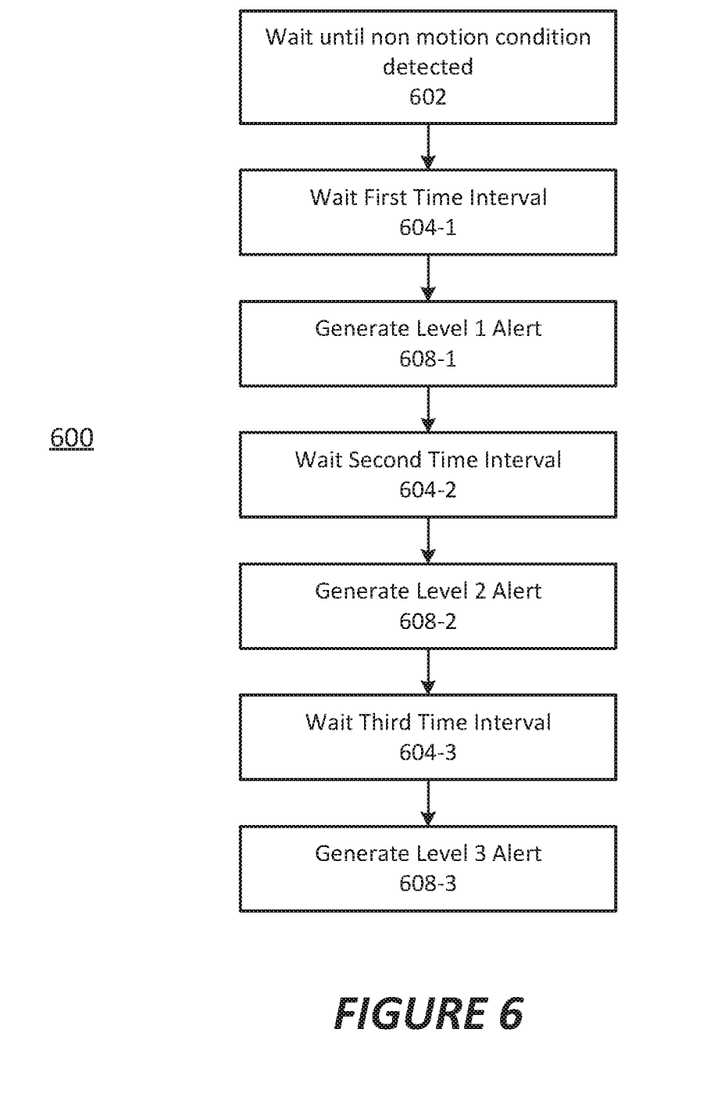
FIG. 6 is a flow chart illustrating operations for alert level escalation according to some embodiments.

Alert escalation by a motion monitoring server 100 is illustrated in FIG. 6. As shown therein, a motion monitoring server 100 that is monitoring a motion sensing device 200 waits until a non-motion condition of the motion sensing device 200 is detected (block 602). Upon detection of the non-motion condition of the motion sensing device 200, the motion monitoring server 100 waits a first time interval (block 604-1), and if the non-motion condition persists, generates a Level 1 (low-level) alert (block 608-1). The motion monitoring server 100 then waits for a second time interval (block 604-2) to see if the non-motion condition persists or if a response is received to the Level 1 alert.

If the non-motion condition persists and no response is received to the Level 1 alert, the motion monitoring server 100 generates a Level 2 (higher level) alert (block 608-2). The motion monitoring server 100 then waits for a third time interval (block 604-3) to see if the non-motion condition persists or if a response is received to the Level 2 alert. If the non-motion condition persists and no response is received to the Level 2 alert, the motion monitoring server 100 generates a Level 3 (highest level) alert (block 608-3).

The first, second and third time intervals may have different durations. In some embodiments, the durations of the first, second and third time intervals may decrease as the non-motion condition persists. Likewise, the first, second and third alert levels may have increasing levels of urgency as the non-motion condition persists.

Although three alert levels are illustrated in FIG. 6, it will be appreciated that more or fewer alert levels may be used.

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

In the drawings and specification, there have been disclosed typical embodiments of the inventive concepts and, although specific terms are employed, they are used in a generic and descriptive sense only and not for purposes of limitation, the scope of the inventive concepts being set forth in the following claims.

The invention claimed is:

1. A computer implemented method for monitoring personnel activity in a work environment, comprising:
receiving motion sensor data generated by a motion sensing device that is carried on or by a worker;
determining a location of the motion sensing device;
obtaining position history information of the motion sensing device;
detecting a lack of expected movement of the motion sensing device; and
generating an alert based on the motion sensor data, the location of the motion sensing device, the position history information, and the detected lack of expected movement of the motion sensing device, wherein a level of the alert is based on the location of the motion sensing device.

2. The method of claim 1, wherein detecting the lack of expected movement of the motion sensing device comprises determining, from the motion sensor data, that movement of the motion sensing device has dropped below a threshold level for a predetermined period of time.

3. The method of claim 1, further comprising:
determining a geographic zone in which the motion sensing device is located; and
obtaining a threat level associated with the geographic zone in which the motion sensing device is located;
wherein the level of the alert is based on the threat level associated with the geographic zone in which the motion sensing device is located.

4. The method of claim 3, wherein obtaining the threat level associated with the geographic zone comprises obtaining the threat level from a library of geographic zones that contains expected motion profiles associated with the geographic zones, the method further comprising:
comparing movement of the motion sensing device with an expected motion profile associated with the geographic zone to determine lack of expected movement of the motion sensing device.

5. The method of claim 1, wherein the motion sensor data comprises first motion sensor data, the method further comprising:
receiving second motion sensor data generated by a second motion sensing device that is carried on or by the worker; and
comparing the second motion sensor data with the first motion sensor data;
wherein the alert is generated based on the first motion sensor data and the second motion sensor data.

6. The method of claim 1, wherein receiving the motion sensing data comprises receiving the motion sensing data from an accelerometer and/or a satellite positioning device.

7. The method of claim 1, wherein receiving the motion sensing data comprises receiving an indication of lack of expected movement of the motion sensing device.

8. The method of claim 1, further comprising:
receiving non-motion sensor data generated by a non-motion sensing device that is carried on or by the worker;
wherein the alert is generated in response to the non-motion sensor data in combination with the motion sensor data and the location of the motion sensing device.

9. The method of claim 8, wherein receiving the non-motion sensor data comprises receiving at least one of chemical sensor data, vibration sensor data, temperature sensor data, barometric pressure sensor data, audio sensor data, and toxin sensor data.

10. The method of claim 1, further comprising:
transmitting an alarm to an electronic device carried on or by the worker in response to the location of the motion sensing device and the detected lack of movement of the motion sensing device.

11. The method of claim 1, further comprising:
validating the alert based on aggregating sensor data from a plurality of sensors including the motion sensing device; and
initiating a responsive action based on validating the alert.

12. The method of claim 1, further comprising applying a set of non-motion rules to the detected lack of motion, wherein the alert is generated based on the set of non-motion rules.

13. The method of claim 1, further comprising generating the alert based on application of a neural network having as inputs the detected lack of motion of the motion sensing device and the location of the motion sensing device.

14. The method of claim 1, further comprising:
generating a first alert; and
if no response is received to the first alert, generating a second alert after a first period of time, wherein the second alert has a higher priority level than the second alert.

15. A system for monitoring personnel activity in a work environment, comprising:
a processing circuit; and
a memory circuit coupled to the processing circuit, wherein the memory circuit comprises computer-readable program instructions that, when executed by the processing circuit, cause the system to perform operations of:
receiving motion sensor data generated by a motion sensing device that is carried on or by a worker;
receiving non-motion sensor data generated by a non-motion sensing device that is carried on or by the worker;
detecting a lack of expected movement of the motion sensing device;
determining a location of the motion sensing device; and
generating an alert based on the location of the motion sensing device and the detected lack of expected movement of the motion sensing device, wherein the alert is generated in response to the non-motion sensor data in combination with the motion sensor data and the location of the motion sensing device.

16. The system of claim 15, wherein detecting the lack of expected movement of the motion sensing device comprises determining, from the motion sensor data, that movement of the motion sensing device has dropped below a threshold level for a predetermined period of time.

17. The system of claim 15, wherein a level of the alert is based on the location of the motion sensing device.

18. A computer program product for monitoring personnel activity in a work environment, the computer program product comprising:
a non-transitory computer readable storage medium having computer readable program code embodied in the medium, the computer readable program code comprising:
computer readable program code configured to receive motion sensor data generated by a motion sensing device that is carried on or by a worker;
computer readable program code configured to detect a lack of expected movement of the motion sensing device;
computer readable program code configured to apply a set of non-motion rules to the detected lack of expected movement;
computer readable program code configured to determine a location of the motion sensing device; and
computer readable program code configured to generate an alert based on the location of the motion sensing device, the detected lack of expected movement of the motion sensing device, and the applied set of non-motion rules.

19. The system of claim 15, wherein receiving the non-motion sensor data comprises receiving at least one of chemical sensor data, vibration sensor data, temperature sensor data, barometric pressure sensor data, audio sensor data, and toxin sensor data.

* * * * *